Patented Dec. 12, 1933

1,939,201

UNITED STATES PATENT OFFICE 1,939,201

DIBENZOXACARBOCYANINES AND PROCESS OF PREPARING THEM

Leslie G. S. Brooker, Rochester, N. Y., assignor to Eastman Kodak Company, Rochester, N. Y., a corporation of New York No Drawing. Application February 20, 1932
Serial No. 594,380

16 Claims. (Cl. 260—44)

This invention relates to new chemical compounds and more particularly to a new class of photographic sensitizing dyes known as dibenzoxacarbocyanines, and methods for their preparation.

It has been known for some time in the photographic art that in order to render photographic emulsions, such as gelatino-silver-halide emulsions, sensitive to substantially all of the visible rays of the spectrum, it is necessary to treat the emulsions, either by overcoating or by admixture with the emulsions themselves, with a compound which extends or enhances the sensitivity of the emulsions to light beyond their natural sensitivity. Many dyes suitable for this purpose have been previously described in the literature, such for instance as pseudocyanine, sensitol red, kryptocyanine, thiocarbocyanine, and others. Additional ones have also been described in my previously filed co-pending applications, such for instance as the naphthocarbocyanines described in my Patent No. 1,846,300, granted Feb. 23, 1932 and my application Serial No. 435,105, filed March 12, 1930. The dibenzoxacarbocyanines described in the instant application were likewise described in the above mentioned patent, in which it was related that instead of employing a methyl-naphthothiazole as the starting material for producing the dibenzothiocarbocyanine, one could replace the sulphur in the thiazole by oxygen and produce a dibenzoxacarbocyanine by using the methylnaphthoxazole as the starting material. These dibenzoxacarbocyanines sensitize a gelatino-silver-halide emulsion containng them to the yellow-green portion of the spectrum, contributing a maximum sensitivity at approximately 5550 Angstrom units.

It is an object of this invention, therefore, to provide a new class of sensitizing dyes for photographic emulsions, and further to provide a process by which those dyes may be readily prepared. It is a specific object of this invention to prepare dibenzoxacarbocyanines and to provide a method for their preparation. Other objects will occur to those skilled in the art upon a further perusal of this specification.

The compound known as 2-methyl-β-naphthoxazole, for instance, was first described, together with its method of preparation by Böttcher (Ber., 1883, 16, 1933). A somewhat different method of preparing this base was later described by Michel & Grandmougin (Ber., 1892, 25, 3429). The structure of the 2-methyl-β-naphthoxazole is as follows:

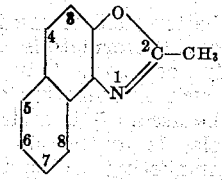

The numbering given is that used in Richter's "Lexikon der Kohlenstoff Verbindungen" and also in "Chemical Abstracts". The 1-methyl-α-naphthoxazole may be prepared from 2-amino-1-naphthol in a manner similar to that described by Michel and Grandmougin (loc. cit.) for the isomeric 2-methyl-β-naphthoxazole.

This base will yield dibenzoxacarbocyanine dyes, the formation of which probably takes place as follows: first, the base is converted into a suitable alkyl quaternary salt, such as the metho-or etho-p-toluenesulfonate or the methiodide or ethiodide, by heating the base with a suitable substance such as methyl p-toluenesulfonate or methyl iodide under appropriate conditions, for instance,

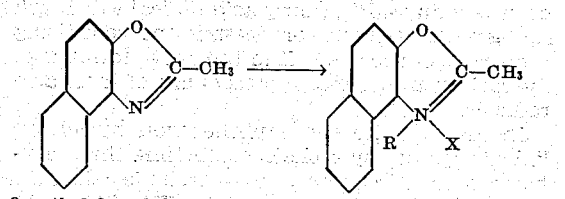

2-methyl-β-naphthoxazole    2-methyl-β-naphthoxazole alkyl quaternary salt where R is an alkyl group such as methyl or ethyl, and X is a suitable acidic radical, such as p-toluenesulfonate or iodide.

This quaternary salt, for instance, 2-methyl-β- naphthoxazole metho-para-toluenesulfonate (2 mols.) is then heated with ethyl orthoformate (1 mol.) in the presence of anhydrous pyridine whereupon the dye is formed. The reaction may be represented as follows:

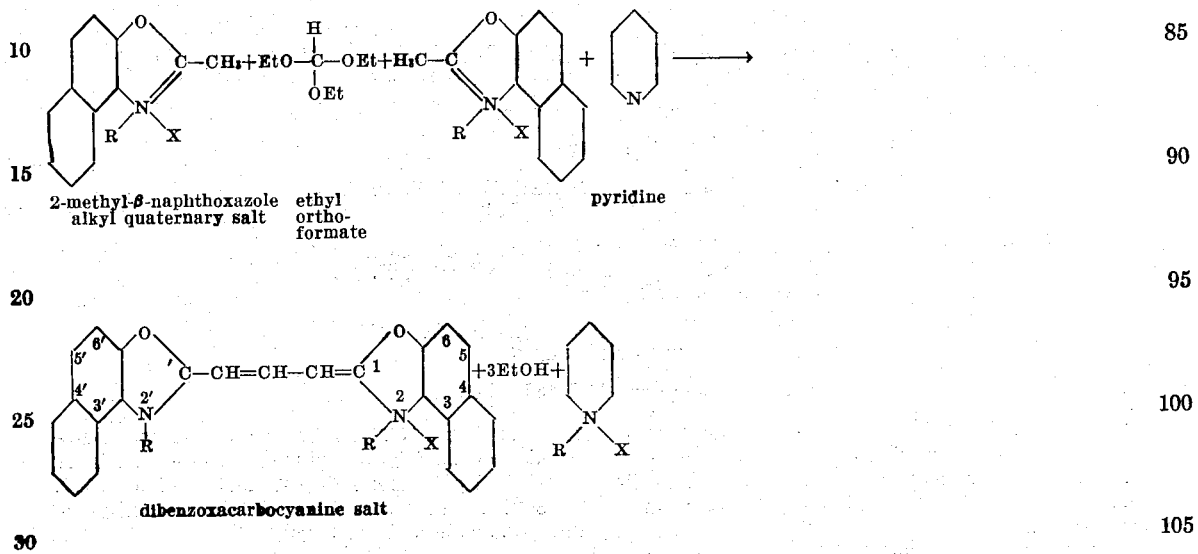

2-methyl-β-naphthoxazole alkyl quaternary salt    ethyl ortho-formate      pyridine dibenzoxacarbocyanine salt In practice a better yield of dye is obtained if an excess of ethyl orthoformate is employed over that theoretically necessary. Other ortho-esters of formic acid, such as trimethyl orthoformate, may, of course, be used. It is desirable to number the dye molecule in the above fashion in order that this numbering will be in accord with that given to the sulphur containing dye named, for instance, in the above mentioned patent. The final name for a dye of this type therefore becomes 2,2'-dialkyl-3:4:3':4'-dibenzoxacarbocyanine salt. In the above formulae, R may be similar or dissimilar alkyl radicals depending upon whether the naphthoxazole quaternary salt contains only the one alkyl radical or whether two portions of the salt are employed each having a different alkyl radical.

After the formation of the dye, it may be isolated and purified by ordinary chemical methods, or it may be converted into another salt, usually a less soluble one, by double decomposition in the ordinary fashion. For instance the p-toluenesulfonate of a dye may be converted into a bromide by treatment, in solution, with a soluble bromide, such as sodium bromide. The acid radical finally employed may be one such as a halide, perchlorate, nitrate, acetate, p-toluenesulfonate or in fact any salt forming acid radical which will not greatly decrease or destroy the sensitizing properties of the dye. X in the above formulæ of the carbocyanines may represent any of these acid radicals.

In the dyes the two naphthoxazole nuclei are linked together by a chain comprising three carbon atoms. Since the =CH— group is called the methenyl group, the chain =CH—CH=CH— may be called a trimethenyl chain. Cyanine dyes containing this trimethenyl chain are commonly called carbocyanine dyes.

Examples of specific methods by which these dyes may be prepared are as follows, but it will of course be understood that these are not limiting but merely illustrating the manner of effecting the broad principles of my invention.

*Example I.*—2:2'-dimethyl-3:4:3':4'-dibenzoxacarbocyanine bromide 6.1 g. 2-methyl-β-naphthoxazole is heated with 6.2 g. methyl p-toluenesulfonate for 6 hours at about 160° C. During a further 15 hours heating at 130–140° C. the product solidifies to a brownish solid. The product, substantially 2-methyl-β-naphthoxazole metho-p-toluenesulfonate, is boiled under reflux with anhydrous pyridine (40 cc.) and ethyl orthoformate (5.5 cc., 100% excess). A reddish orange color forms rapidly and refluxing is continued for 45 minutes. A hot solution of excess of potassium bromide (20 g.) in water (100 cc.) is added to the reaction mixture, and the dye is rapidly precipitated as the bromide. The crude dye may be freed from impurities by boiling it successively with water and then with acetone, and then recrystallizing it from methyl alcohol, whereupon it is obtained as a mass of red silky needles which give an orange solution in the solvent.

*Example II.*—2:2'-diethyl-3:4:3':4'-dibenzoxacarbocyanine bromide 9.15 g. 2-methyl-β-naphthoxazole is condensed with 10 g. ethyl p-toluenesulfonate by heating for 6 hours at 160–180° C. and for 15 hours at 130–140° C. The crude quaternary salt as thus obtained forms a very viscous yellowish-brown liquid.

The crude product obtained above, substantially 2-methyl-β-naphthoxazole etho p-toluenesulfonate may be used without purification. It is refluxed for 45 minutes with anhydrous pyridine (30 cc.) and ethyl orthoformate (8.2 cc., 100% excess). The dye is then precipitated as the bromide by adding an excess of a warm solution of potassium bromide (20 g.) in water (100 cc.). After filtering, the dye may be washed with water and then with hot acetone and finally recrystallized from methyl alcohol, in which it gives an orange solution. It is obtained as reddish needles.

In the same manner that the 3:4:3':4' dibenzoxacarbocyanine is prepared, one may prepare the 5:6:5':6' dibenzoxacarbocyanine, if one were to start with the 1-methyl-alpha-naphthoxazole instead of the 2-methyl-β-naphthoxazole as above described. The structure of the base is given below, as well as that of an oxacarbocyanine dye derived from it.

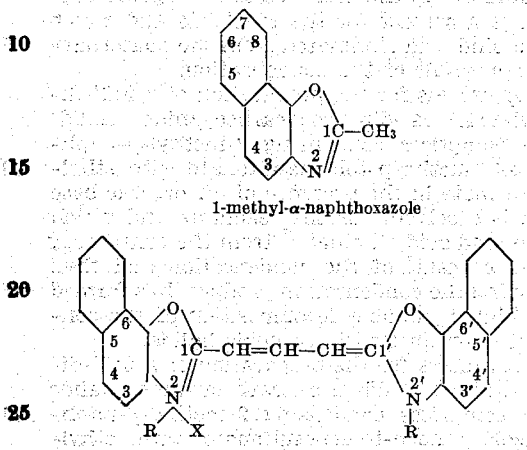

1-methyl-α-naphthoxazole 2,2'-dialkyl-5:6:5':6'-dibenzoxacarbocyanine salt.

The numbering is that used in my application where the corresponding sulfur-containing compounds were used, namely No. 337,177.

Since the preparation of 1-methyl-α-naphthoxazole is not described in the literature it will be given here.

2-nitro-1-naphthol is first prepared (see, for instance, Hodgson & Kilner, J. C. S. 1924, 125, 807). This compound is then reduced to the corresponding 2-amino-1-naphthol, using tin and hydrochloric acid as recommended by Liebermann & Dittler (Ber., 1874, 7, 240; Liebermann, Ann., 1876, 183, 246). The hydrochloride of the base is then heated with acetic acid and sodium acetate for several hours in a similar fashion to that prescribed for the preparation of 2-methyl-β-naphthoxazole by Michel & Grandmougin (Ber., 1892, 25, 3429). The excess of acetic acid is then slowly distilled off and the residue is finally distilled in vacuum, using an oil bath to heat the reaction flask. The base distills over and is purified by dissolving the distillate in ligroin, allowing a solid impurity to crystallize out first, and then isolating the base from the mother liquor. The 1-methyl-α-naphthoxazole is obtained as a low melting solid.

For the preparation of the dyes the base is converted into a quaternary salt such as the methyl p-toluenesulfonate or the ethiodide in the usual way. The quaternary salt is then condensed with ethyl orthoformate in the presence of anhydrous pyridine as described for the isomeric dyes derived from 2-methyl-β-naphthoxazole.

*Example III*

1 part of 1-methyl-α-naphthoxazole is heated on a steam bath with 1.05 parts of methyl p-toluenesulfonate for several hours. Addition is rapid and the quaternary salt, 1-methyl-α-naphthoxazole metho-p-toluenesulfonate sets to a mass of crystals. This is then refluxed with 25 parts of anhydrous pyridine and 1.6 parts of ethyl orthoformate (300% excess of the latter;— the yield is improved by taking an excess of the ester). Within a few minutes the dye begins to separate, the p-toluenesulfonate of the dye being very sparingly soluble in pyridine, hot or cold. After 30 minutes refluxing, the reaction mixture is allowed to cool, and the dye is then filtered off and washed with cold pyridine and then dried. The yield is about 1.3 parts. This dye is 2,2'-dimethyl-5:6:5':6'-dibenzoxacarbocyanine p-toluenesulfonate.

The dye may be converted into the bromide by dissolving it in boiling methyl alcohol and adding an excess of an aqueous solution of an alkali bromide, such as potassium bromide, to the alcoholic solution. The bromide of the dye is almost insoluble in alcoholic-aqueous solution in the presence of a large excess of bromide ions and may be filtered off, washed with water, and then purified by recrystallization from ethyl or methyl alcohol. This dye is called methyl-5:6:5':6' - dibenzoxcarbocyanine bromide. If potassium iodide is used in place of potassium bromide then the still less soluble dye iodide is formed. The bromide of the dye crystallizes from methyl alcohol as a felted mass of hair-like crystals, reddish-orange in color. The solution of the dye in the solvent named is orange.

*Example IV*

If 1.1 parts of ethyl p-toluenesulfonate are used instead of the 1.05 parts of methyl p-toluene-sulfonate are used in the preceding example, and the two components are heated on the steam bath for 24 hours, 1-methyl-α-naphthoxazole etho-p-toluenesulfonate is produced. This salt is condensed with ethyl orthoformate in boiling pyridine solution in the same manner described in the preceding example, using 10 parts of pyridine and 1.6 parts of the orthoester. After 30 minutes refluxing the dye is precipitated from the deeply colored solution by adding thereto an excess of an aqueous solution of potassium iodide. The dye is filtered off, washed with water and with acetone, and is purified by several recrystallizations from methyl alcohol, in which it gives an orange solution. The 2,2'-diethyl-5:6:5':6'-dibenzoxacarbocyanine iodide is obtained in beautiful garnet-red crystals with a strong blue reflex.

The naphthalene nuclei in both the μ-methyl-naphthoxazoles may be left unsubstituted or they may be substituted.

What I claim is:

1. A process for the preparation of dibenzoxacarbocyanine dyes which comprises condensing two molecular proportions of a μ-methyl-naphthoxazole quaternary salt with one molecular proportion of ethyl orthoformate in the presence of an organic base which is a solvent for the reactants and which acts to bind acid eliminated from the quaternary salt as a result of the condensation.

2. A process for the preparation of dibenzoxacarbocyanine dyes which comprises condensing two molecular proportions of a μ-methyl-naphthoxazole alkyl quaternary salt with one molecular proportion of ethyl orthoformate in the presence of an organic base which is a solvent for the reactants and which acts to bind acid eliminated from the quaternary salt as a result of the condensation.

3. A process for the preparation of dibenzoxacarbocyanine dyes which comprises condensing two molecular proportions of a 2-methyl-β-naphthoxazole alkyl quaternary salt with one molecular proportion of ethyl orthoformate in the presence of an organic base which is a solvent for the reactants and which acts to bind acid eliminated from the quaternary salt as a result of the condensation.

4. A process for the preparation of dibenzoxacarbocyanine dyes which comprises condensing two molecular proportions of a mu-methyl naphthoxazole alkyl quaternary salt with one molecular proportion of ethyl orthoformate in the presence of an organic base which is a solvent for the reactants and which acts to bind acid eliminated from the quaternary salt as a result of the condensation and then converting the condensation product thus formed to a halide by double decomposition of the condensation product with a soluble halide.

5. A process for the preparation of dibenzoxacarbocyanine dyes which comprises condensing two molecular proportions of a 2-methyl-β-naphthoxazole alkyl quaternary salt with one molecular proportion of ethyl orthoformate in the presence of an organic base which is a solvent for the reactants and which acts to bind acid eliminated from the quaternary salt as a result of the condensation and then converting the condensation product thus formed to a halide by double decomposition of the condensation product with a soluble halide.

6. A process for the preparation of dibenzoxacarbocyanine dyes which comprises condensing two molecular proportions of a mu-methyl-naphthoxazole alkyl quaternary salt with one molecular proportion of ethyl orthoformate in the presence of pyridine.

7. A process for the preparation of dibenzoxacarbocyanine dyes which comprises condensing two molecular proportions of a 2-methyl-β-naphthoxazole alkyl quaternary salt with one molecular proportion of ethyl orthoformate in the presence of pyridine.

8. A process for the preparation of a 2:2'-dimethyl - 3:4:3': 4' - dibenzoxacarbocyanine salt which comprises condensing 2-methyl-β-naphthoxazole metho-p-toluenesulfonate with ethylorthoformate in the presence of an organic base which is a solvent for the reactants and which acts to bind acid eliminated from the quaternary salt as a result of the condensation.

9. A process for the preparation of a 2:2'-diethyl - 3 : 4 : 3' : 4' - dibenzoxacarbocyanine salt which comprises condensing 2-methyl-β-naphthoxazole etho-p-toluenesulfonate with ethylorthoformate in the presence of an organic base which is a solvent for the reactants and which acts to bind acid eliminated from the quaternary salt as a result of the condensation.

10. A process for the preparation of a 2:2'-dimethyl-3:4:3':4'-dibenzoxacarbocyanine halide which comprises condensing 2-methyl-β-naphthoxazole metho-p-toluenesulfonate with ethylorthoformate in the presence of an organic base which is a solvent for the reactants and which acts to bind acid eliminated from the quaternary salt as a result of the condensation and then converting the condensation product thus formed to a halide by double decomposition of the condensation product with a soluble halide.

11. A process for the preparation of a 2:2'-diethyl - 3:4:3':4' - dibenzoxacarbocyanine halide which comprises condensing 2-methyl-β-naphthoxazole etho-p-toluenesulfonate with ethylorthoformate in the presence of an organic base which is a solvent for the reactants and which acts to bind acid eliminated from the quaternary salt as a result of the condensation and then converting the condensation product thus formed to a halide by double decomposition of the condensation product with a soluble halide.

12. A dialkyl-dibenzoxacarbocyanine salt.

13. A dialkyl-dibenzoxacarbocyanine bromide.

14. A 2:2'-dialkyl-3:4:3':4'-dibenzoxacarbocyanine salt.

15. 2:2'-dimethyl -3:4:3':4'- dibenzoxacarbocyanine bromide.

16. 2:2' - diethyl - 3:4:3':4'-dibenzoxacarbocyanine bromide.

LESLIE G. S. BROOKER.